United States Patent [19]
Dossier

[11] 3,984,997
[45] Oct. 12, 1976

[54] FRICTION TORQUE LIMITERS

[75] Inventor: Michel Dossier, Orgeual, France

[73] Assignee: Agence Nationale de Valorisation de la Recherche (ANVAR), Neuilly-sur-Seine, France

[22] Filed: Aug. 22, 1974

[21] Appl. No.: 499,599

[30] Foreign Application Priority Data
Aug. 30, 1973 France .............................. 73.31476

[52] U.S. Cl. ................................ 64/27 R; 64/27 B; 64/15 R; 64/30 R; 64/1 V
[51] Int. Cl.² ........................................... F16D 3/14
[58] Field of Search ................ 64/27 B, 27 R, 15 B, 64/15 R, 15 C, 30 R, 6, 1 V

[56] References Cited
UNITED STATES PATENTS

| | | | |
|---|---|---|---|
| 3,141,313 | 7/1964 | Brickett et al. | 64/27 B |
| 3,166,168 | 1/1965 | Hornschurch | 64/27 R |
| 3,321,988 | 5/1967 | Pergs | 64/27 B |
| 3,726,133 | 4/1973 | Morgan | 64/15 C X |
| 3,890,803 | 6/1975 | Neal et al. | 64/27 R X |

FOREIGN PATENTS OR APPLICATIONS

| | | | |
|---|---|---|---|
| 1,158,075 | 7/1969 | United Kingdom | 64/27 R |
| 224,491 | 4/1925 | United Kingdom | 64/27 R |

Primary Examiner—Samuel Scott
Assistant Examiner—Randall Heald
Attorney, Agent, or Firm—Larson, Taylor and Hinds

[57] ABSTRACT

A rotary coupling of the torque limiter type comprises two bodies rotating axially one within the other, with intermediate connecting elements inserted between respective surfaces of said bodies and subject to the action of springs acting in the tangential direction. The connection between the two bodies is effected by means at least partially deformable adapted to rub coaxially on one of said bodies, thereby receiving the motion of the other body, through a drive device combined with elastic means of the torsion spring type. The elastic means may be constituted by at least one torsion bar arranged for example axially to the coupling. The intermediate connecting elements, receiving the effect of the torsion means, may be constituted by shoes.

21 Claims, 9 Drawing Figures

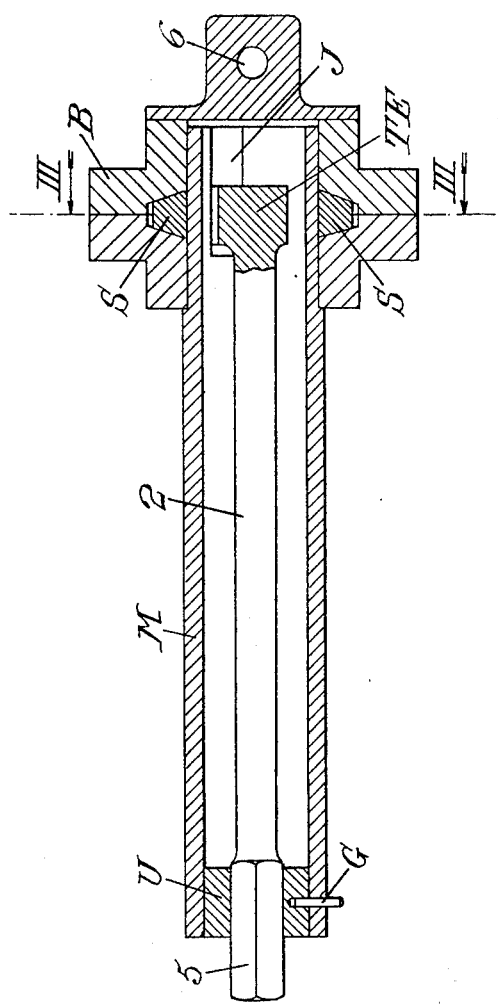

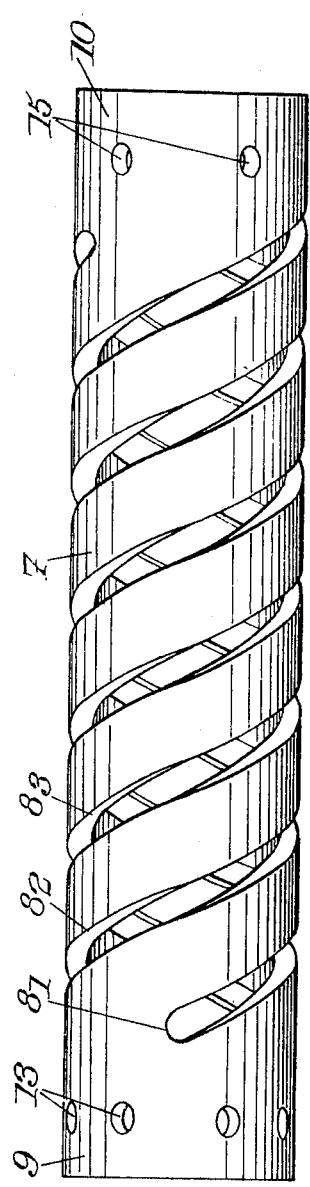
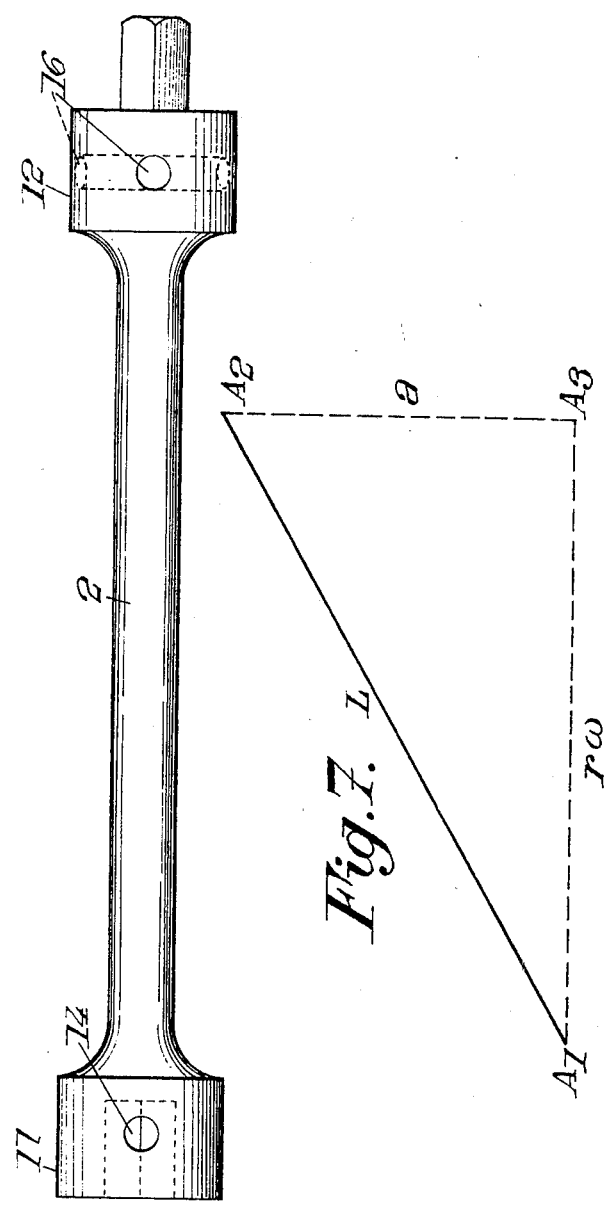
Fig.5.
Fig.6.
Fig.7.

FRICTION TORQUE LIMITERS

The invention relates to torque limiters of the friction type, that is to say to assemblies in which the transmission between the driving part and the driven part comprises the interposition of friction elements combined with elastic means so that, for a limiting valve of the drive torque, slipping occurs between the friction elements, whence arises the torque limiting effect and, as necessary, an indication of the limiting valve reached.

Such devices find application especially as safety members in machines, in handling equipment. They are also encountered as adjusting elements of tools (for example for screwing, to avoiding clamping torques which are too high) or again as sensitive elements of dynamometric instruments.

In known devices of the type concerned, recourse is mostly had to friction elements gripped against one another by precompressed or prestretched elastic means, exerting their force transversally to the frictional surfaces.

This type of action has various drawbacks. On the one hand, the limiting level, at which the torque limitation occurs, is variable directly as a function of the coefficient of friction, hence between very wide tolerances. On the other hand, the normal limiting level of the torque to be transmitted, is the same for the two directions of rotation, although, in various important applications, it is desirable that the limiting values of the torque be different for the two directions concerned.

Thus, where the production of a dynamometric torque wrench for nuts, bolts or screws, is concerned, it may be desirable, on the one hand, to have the limiting torque slip intervene at a well-defined screwing torque, but, on the other hand, for the reverse movement, that is to say for unscrewing, a distinctly higher torque is provided, to take into account the presence of rust, if necessary.

The problem occurs in the operating shaft included in agricultural or other tractors, for the rotational actuation of various machines. It is necessary to be able to limit the torque to a safety value in the direction of rotation corresponding to the work of the machine driven by the motor or the tractor and also to limit it, but to a value distinctly smaller in the other direction, to avoid, when it is desired to stop the motor, from it being driven reciprocally by the coupled machine tending, by inertia, to continue its motion.

To respond to these desiderata and to overcome the drawbacks of existing torque limiters, a limiter of this type is essentially constituted, according to the invention, by two bodies rotating axially one with the other, with the interposition, between these bodies, of intermediate connecting means at least partially deformable and adapted, on the one hand, to rub coaxially on one of said bodies, for example the outer body, over at least a portion of a turn, on the other hand, to receive the motion of the other body, for example the inner body, through a driving device combined with elastic torsion means arranged for example along the general common axis, controlled or preadjusted, adapted to communicate to said connecting means a tangential state of tension, and to establish thus a limiting torque of slippage whose value depends on the direction of application of said torque, according as it exerts its force on said connecting means, either directly, in opposition with said elastic means, or on the contrary, through the latter in the same sense as them.

It will be seen below that, if by $\Gamma$ is denoted a certain pre-set torque depending only on the mechanical characteristics of the assembly, with the exclusion of friction, the two limiting torques, for the two opposite directions of rotation, will be the following:

a. for one direction, if the coefficient of friction on the frictional services concerned is denoted by $f$, and the angle of winding along these surfaces by $\omega$, the limiting torque of slippage C has for its value:

$$C = \Gamma \left(1 - \frac{1}{e^{f\omega}}\right).$$

It will be immediately observed that, if one takes for $f\omega$ a sufficiently high value, the limiting torque C will be little different from $\Gamma$ and, consequently, little influenced by the possible variations in the coefficient of friction $f$.

Now, as will be seen below, it is possible to select, due to suitable embodiments a high product $f\omega$.

To this end, the value $\omega$ may be set, by arranging that the intermediate connecting means specified above be realised by helicoidal tapes winding several times around the axis of the limiter concerned. However it is also possible to set $f$ by resorting to friction linings of suitable type, by producing frictional surfaces with profiles, not simply cylindrical, but biconical or multiconical, etc.;

b. for the other direction of rotation, it is shown that the new limiting slippage torque has a value C' different from C, namely:

$$C' = \Gamma (e^{f\omega} - 1).$$

Whence it is seen that this value C' is higher than C, and this in the ratio:

$$\frac{C'}{C} = e^{f\omega}$$

There are hence established, due to the invention, the above contemplated ideal conditions.

Another prefered feature of the invention consists of forming the intermediate connecting means by at least one helocoidal flexible tape, driven elastically by one of the two bodies and adapted to be applied by friction on to the other body under the effect of tangential forces which are transmitted to it, this whatever the nature of the elastic means used (even pneumatic, magnetic, etc.), the torsion spring appearing however to be the most indicated. This embodiment enables values of 10 to 20 radians or more to be easily adopted for $\omega$.

To the same end, the abovesaid intermediate means may be formed by a tube split along helicoidal slots displaced by a certain angle, for example so as to form three tapes, of the above-mentioned type, offset by 120°.

When recourse is had, to exert the elastic tension, to a torsion spring, the latter is advantageously formed by a torsion bar interposed between the ends of the tapes as envisaged above, the assembly being driven by the inner body (for example), and communicating the torque to the outer body (for example), by friction of the abovesaid tapes on an internal bore of this outer body, constituted most simply by a tube.

The invention comprises, apart from these main features, certain other features which are preferably used at the same time and which will be more explicitly discussed below, in particular features adapted to ensure easy adjustment of the tension of the above-mentioned torsion means.

It contemplates, more particularly, certain types of application, as well as certain embodiments, of said features; and it envisages, more particularly again and this by way of new industrial products, equipment of the type concerned comprising the application of these same features, as well as special elements adapted for their construction and assemblies comprising such equipment.

And it will, in any case, be well understood by means of the additional description which follows, as well as of the accompanying drawings, which description and drawings are, of course, given particularly by way of non-limiting indication.

In the drawings:

FIGS. 2 and 3 show, respectively in axial section along the line II—II of FIG. 3 and in transverse section along the line III—III of FIG. 2, a torsion bar torque limiter, according to one embodiment of the invention.

FIGS. 5 and 6 illustrate a modification of the embodiment of FIG. 4 and show respectively in elevation a split tube and a torsion bar which has to cooperate with this tube, the whole to be engaged in an outer tube as in the case of FIG. 4.

FIG. 7 is a diagram illustrating the operation of a torque limiter according to the invention.

According to the invention, and more especially according to those of its types of application, as well as according to those embodiments of its various parts, to which it seems that preference should be given, in order to construct the torque limiter, procedure is as follows or in similar manner.

Figure 1:
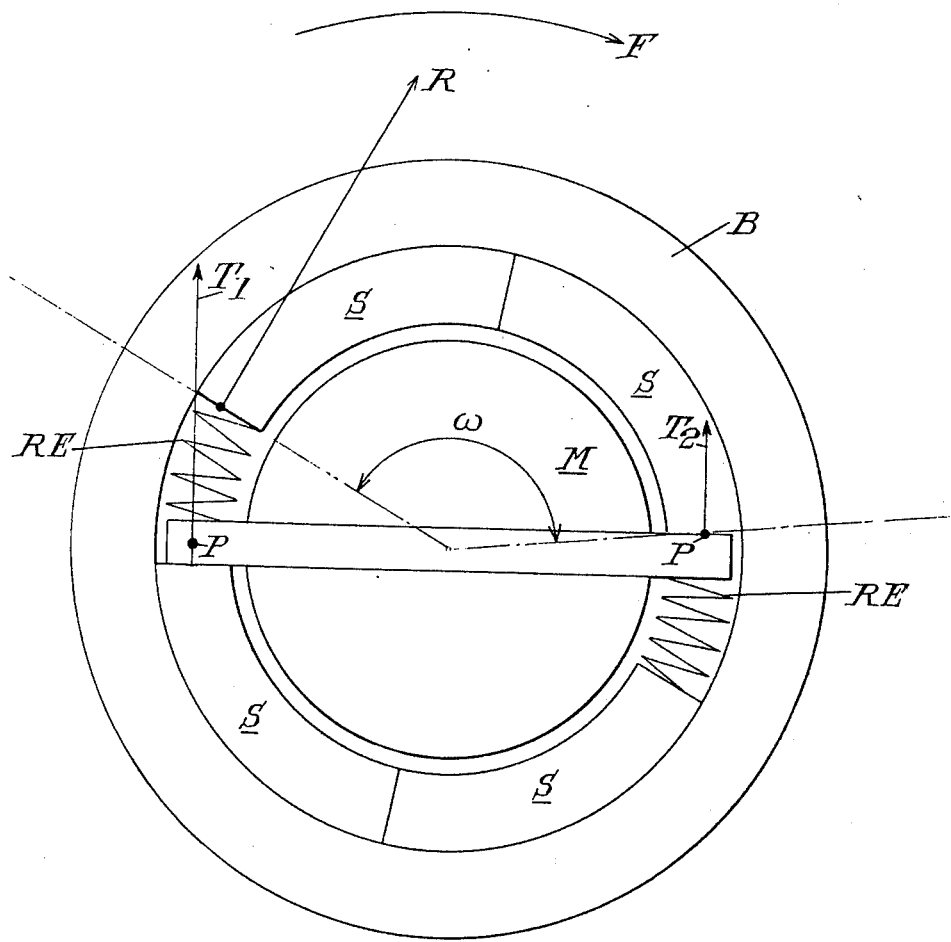
FIG. 1 illustrates in diagrammatic transverse section the principle of the invention.

There is illustrated in FIG. 1, the principle of the invention.

In this figure, a hub M drives stops P, inside an outer a ring B intended to receive the torque, which is transmitted from said stops P through series of shoes S sliding on the inner cylinder surface of the ring, and supported on it, under the effect of a spring RE interposed between shoes S and stops P and transmitting to said shoes S tangential forces T.

Now it will first be assumed that B is fixed and the hub M subject to a torque of value $2r\,T_1$, where $T_1$ is a tangential force transmitted by the stop P and $r$ its radius of application, $T_1$ tending to cause B rotate in the direction F.

It is known, according to the theory of winding of cables on a cylindrical core, the force R transmitted to the assembly of shoes is balanced, at the opposite end, by an opposing tangential force $T_2$ corresponding to the relationship:

$$R = T_2\, e^{f\omega}$$

Under these conditions, slippage is produced when:

$$T_1 + T_2 = R$$

from which it is deduced that:

$$T_1 = R\left(1 - \frac{1}{e^{f\omega}}\right).$$

And if by $\Gamma$ one denotes the valve $\Gamma = 2r\,R$, which value only depends on the spring RE and other mechanical features of the assembly, but not on the coefficient of friction $f$, the limiting torque of slippage C will have the value:

$$C = \Gamma\left(1 - \frac{1}{e^{f\omega}}\right).$$

Hence starting from the value $\Gamma$ which can be called "pre-set torque," a limiting torque C as close to $\Gamma$ as desired can be obtained, practically insensitive to variations in the coefficient of friction $f$, on condition that the product $f\omega$ is sufficiently great.

Now, in this product, it is easy to increase $\omega$, since the embodiment shown in FIG. 1, where $\omega$ is less than $\pi$, is only an example and, as will be seen below, it is possible to produce, for shoes S or other elements similar thereto, a helicoidal winding with several turns.

It is in addition possible to increase, if necessary, the value of $f$, by resorting to friction linings, with bi- or multiconical contact surfaces, etc. Since $f\omega$ appears as an exponent in a denominator, the quotient $$\frac{1}{e^{f\omega}}$$

is rapidly close to zero, or in any case is low.

Hence, in one direction of rotation F, which will be for example, for a dynamometric nut-tightening device or torque wrench, that for the tightening of the nut, the tightening torque will always be limited to the above mentioned value of C, little different from the said valve $\Gamma$ and relatively insensitive to possible variations in the coefficient of friction.

In addition, this device is easily adjustable, since the said valve $\Gamma$ is equal to $2r\,R$, and consequently it can be made to vary easily by modifying the tension R of the spring RE.

For the other direction of rotation (hence the reverse of F in FIG. 1), the conditions are different due to the fact that the driving force $T_1$ is transmitted from the stop P, no longer through springs RE, but directly to the shoes S.

The opposing tangential force $T_2$ is then: $T_2 = R e^{f\omega}$ and slippage is produced when: $T_1 + R = T_2 = R e^{f\omega}$ the result of which would be that the slippage torque $C'$, greater than C, is of the form:

$$C' = \Gamma(e^{f\omega} - 1).$$

The ratio of the two torques $C'/C$ is equal to $e^{f\omega}$.

Starting from the principle explained with reference to FIG. 1, the invention comprises several essential features, of which one consists of forming the elastic means RE by a torsion spring, for example by a torsion bar.

This feature is particularly advantageous, since it enables this torsion bar to be housed along the axis of the coupling or of a tool and, in addition, it enables easy adjustment of the elastic tension, hence of the value of the limiting torque.

Assuming again that it relates to a tool of the type for ensuring for example the screwing or unscrewing of a nut, screw or other member, such a tool is arranged for example in a manner illustrated in FIGS. 2 and 3.

It is seen in this figure that the part M of FIG. 1 is now constituted by a hollow tube, which is capable of being driven at one end by the part B, but here again through a coupling of the type of that of FIG. 1. At P are indicated the stops fast to the tube M, at S the shoes, which are of biconical section and cooperate with similar surfaces provided in the part B.

The spring is constituted by a torsion bar of which one end or head TE, facing the coupling, comprises stops Q which exert the elastic force on the shoes S, whilst the other end is fixed at U to the corresponding end of the tube M.

The fixing at U is effected with a pretermined torsion of the bar 2, the whole operated like the device of FIG. 1, the two series of shoes S being compressed, by the elastic bar, between the stops P and Q.

The stops Q of the head TE traverse suitables slots J of the body M.

At the end at U, the bar 2 is terminated for example by square bar 5 passed through the ring U, which can be fixed by a pin G passing through one of the various holes formed in the tube M. There is thus the possibility of easily adjusting the value of the torsion selected, hence the value of the limiting torque.

This square bar serves also for receiving a bush (not shown) adapted to the dimension of the nuts or screws to be screwed or unscrewed, whilst the body B is pierced by at least one hole 6 in which there can be introduced a manipulating bar.

There is thus obtained a tool for tightening or untightening which receives the drive torque at 6 to transmit it at 5, which tool is simple and only has advantages, especially that of enabling a greater limiting torque for unscrewing than for screwing.

The invention comprises alternatively the arrangement wherein the connection between the two parts of the assembly is constituted, no longer by shoes, but by a helicoidal tape, the whole in combination with elastic means constituted again, preferably, by a torsion bar, which will be arranged along the axis of said tape.

Figure 4:
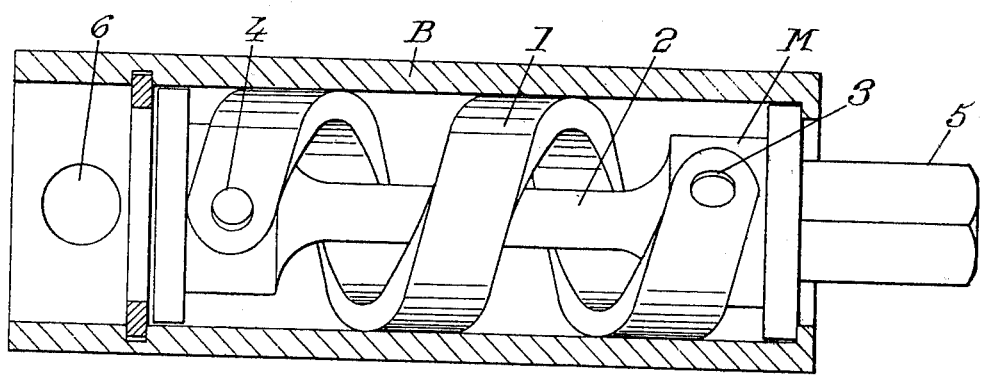
FIG. 4 shows in axial section a torque limiter constructed according to another embodiment of the invention.

This is what is for example shown in FIG. 4 in which:
the shoes S of FIGS. 1 to 3 are replaced by a helicoidal tape 1,
and the elastic means are constituted by a torsion bar 2, at the ends of which, at 3 and 4, are articulated the corresponding ends of said tape.

An apparatus such as is shown in FIG. 4 can serve, like that of FIGS. 2 and 3, as a torque limiter in a workshop, the holes 6 playing the same role. In this arrangement it is apparent that the frictional engagement of the tape increases to drive the driven member as the tape is "unwound" against the internal surface of the driven tube (or "wound-up" against the outer surface of the driven tube if it is located inside of the helical tape rather than outside of it). Hence, for driving in a direction corresponding to F of FIG. 1, the drive tending to unwind the tape starting from end 5 is through the length of the torsion bar 2 and the left end 4 thereof, while drive in the opposite direction tends to unwind tape 3 in the opposite direction via the end 3 of the torsion bar, bypassing the spring portion of bar 2.

The torsion bar 2 must be twisted in its operational position, by a predetermined angle $\alpha$, for which will exert therefore in the tape 1 a torque $K\alpha$ which will here represent the "set" torque $\Gamma$ mentioned above, and which can be adjusted at will, either as the angle $\alpha$ is modified, or as K is modified, which is the stiffness coefficient of the bar.

For the positioning of the tape 1 in the body or tube B, it will suffice, for a momentary modification of the angle $\alpha$, to retighten the said tape temporarily by twisting, that is to say to reduce its outer diameter so that it can penetrate into the body B. It is then allowed to reexpand and take its normal position, with the angle $\alpha$ at the desired value.

It should be noted that the body or tube B could be inside and the tape 1 arranged on the outside, which solution may be advantageous, for example by enabling, in certain applications, cooling through the inside of the tube to be effected easily, by means of fins, or by the passage of liquid coolant.

In the embodiments which have just been described, there is shown a single tape as a helix 1, but it is obvious that several of them could be provided.

In particular, there is illustrated in FIGS. 5 and 6 an embodiment according to which several helicoidal tapes are provided displaced angularly with respect to one another, for example three tapes displaced by 120°, which can be easily obtained by cutting out, in such a tube as 7 (FIG. 5) helicoidal slots 81, 82, 83 respectively staggered by the abovesaid angle $\omega$ of 12.5 radians.

The two ends 9, 10 of this tube, spared from this cutting out, then constitute fixing rings to which elastic torsion forces are applied.

If, for example, there is also used a torsion bar, for example internal, 2 (FIG. 6), the ends 11 and 12, of this bar, are fixed to the abovesaid rings 9 and 10, for example by spigots or pins, fixing elements inserted in corresponding holes 13, 14 on the one hand, and 15, 16 on the other hand, of the facing elements.

If it is desired to be able to adjust at will the tension $\alpha$, it is arranged for example so that the number respective holes 13, 14, or 15, 16, at least at one of the ends of the device, is different. Thus there could be provided, as shown in FIGS. 5 and 6, seven holes 13 for the tube and two holes 14 for the bar, on the one hand, and five holes 15 for the tube and three holes 16 for the bar, on the other hand. There can thus be produced several assembly combinations with a gradation of successive torsion angles $\alpha$, of very slight pitch by reason of the vernier effects at the two ends. Thus, in this example, the pitch would be 1/210 of a turn.

In any case, in such an assembly, it is not required that the various helicoidal tapes obtained be elastic. It is the tangential tension R, communicated from the torsion bar 2 (or from any other elastic means), which must ensure their pressure against the surfaces of the bore of the body B, provided for example on the outside.

In practice, and similarly to that which has been stated for FIG. 4, the flexible element such as the tube 7 with helicoidal slots can be first mounted on the torsion bar 2 and pinned on the latter at the desired angle $\alpha$, which causes a radial deformation of the assembly. To then introduce the assembly into the tubular armature or outer tube B (such as that of FIG. 4)

the diameter must first be reduced, which is done by applying first an additional torsion $d\alpha$ to the bar 2. This operation is facilitated by the presence at the ends of the bar of a square bar 15 and by a square blind hole 16, with which suitable tools are made to cooperate for the obtaining of said torsion. The tube 7 thus being inserted into the body B, it is released and there is thus obtained the final assembly, that is to say the desired torque limiter.

There will now be indicated some additional solutions of adjustment, this time by acting on the axial length $a$ of the flexible device.

In the case where recourse is had to a torsion bar, as illustrated in FIGS. 4 to 6, this axial length is perhaps kept constant.

However, in certain cases, there can be provided a possibility of adjustment of this length, for example in order to adjust also the constant $K\alpha$, that is to say the "set" torque.

The diagram of FIG. 7 shows the triangle illustrating the one or more tapes unrolled in a plane.

One of the sides $A_1 A_2$ represents the unrolled length of said tape. The side $A_1 A_3$ represents the length of the winding around the surface of the receiver tube intended to cooperate with said tape, namely the length $r\omega$ (for example two full circumferences). Finally, the side $A_2 A_3$ represents the axial length $a$ of the tape.

In this rectangle, one has constantly:
$$Ti\ L^2 = a^2 + r^2\ \omega^2$$

It follows that if $a$ is varied, $\omega$ is effected, that is to say the angle of winding or the radial expansion.

Thus the torsion bar, as envisaged above, could be a bar of square section on which could slide longitudinally two rings with a square hole on which the ends of the flexible tapes would be fixed and would be pivoted. An adjustment of $a$ hence enables adjustment of $\omega$, but also $\alpha$, or a corresponding adjustment of the set torque $\Gamma = K\alpha$. A shortening of $a$, for example has the effect of increasing $\omega$ hence also $e^{f\omega}$.

Figure 8:
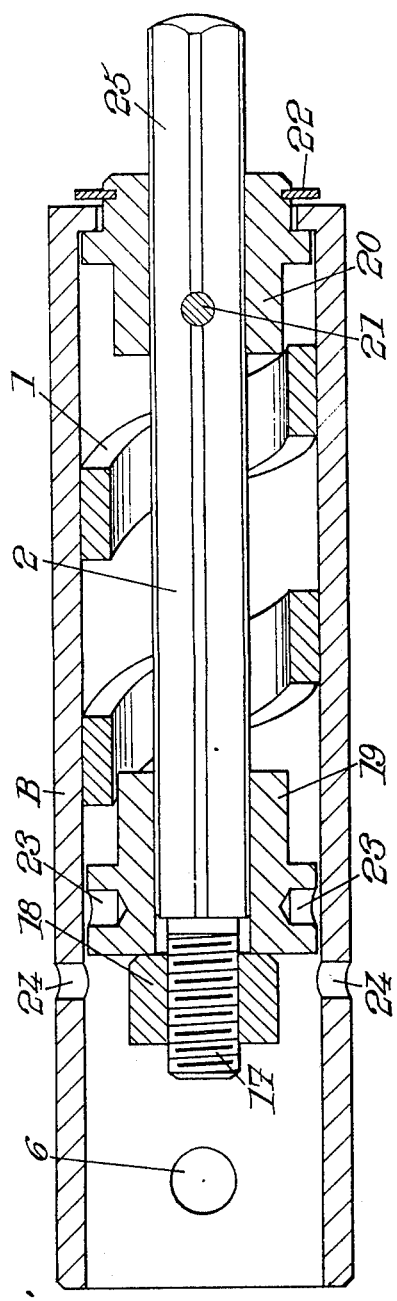
FIG. 8 shows in axial section another modification of the embodiment of FIG. 4, illustrating the adjustment of the "pre-set torque," by a nut screwing on the torsion bar.

FIG. 8 shows a first embodiment of means for adjusting the above said axial length $a$.

In this embodiment, the torsion bar 2 is over the whole of its length of square profile, except at its end 17 where it is threaded to receive an adjusting nut 18, bearing on a sliding ring 19.

The one or more helicoidal elastic elements, such as 1, are fixed and pivoted at their ends (not shown) on rings such as 19 and 20, the ring 20 being fast with the bar 2 through a pin 21.

The adjustment of the "set torque" operates as follows.

It is assumed that at the origin, the tape 1 not being stretched, the whole of the tape 1 and of the bar 2 can be introduced into the tube B. The ring shown at 22, which is a stop ring, is assumed removed.

The ring 19 is then temporarily made fast with a tube B, for example by bringing holes 23 of said ring facing corresponding holes 24 of tube B and pinning the assembly.

This having been done, a tube wrench is engaged on the square end 25 of the bar 2 and the desired twisting torque is exerted between tube B and bar 2, which causes a retightening of the helicoidal tape 1.

It only remains to act on the distance $a$ by screwing a nut 18 until, due to the fact of the diminution of this distance $a$, the turns of the tape 1 by expanding come into contact with the inner surface of the tube B. At this moment, the twisting torque impressed on the tape 1, that is to say the set torque, is held and the assembly can be released. It only remains to remove the above-mentioned pins and to replace in position, axially, the assembly 1, 2 the stop ring 22 being positioned.

Figure 9:
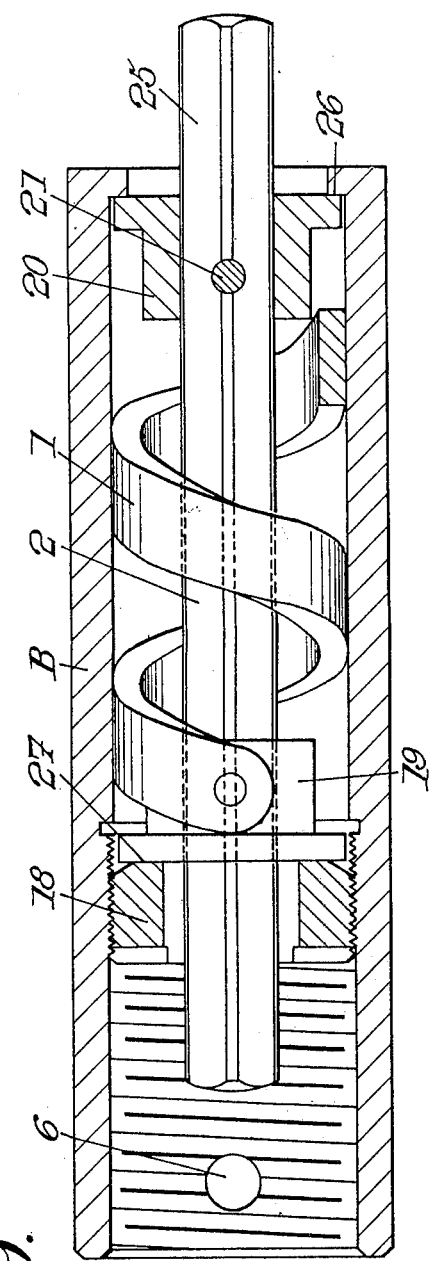
FIG. 9 shows in axial section yet another modification.

FIG. 9 illustrates another embodiment in which the adjusting nut 18 is screwed in the tube B, enabling adjustment of the axial length of the helicoid 1 (length $a$, FIG. 5) by operations close to those which have been described for the embodiment shown in FIG. 8.

Of course, once tightened, this nut is stopped in position by a suitable locking device (not shown).

This embodiment of FIG. 9 is simpler than that of FIG. 8, the bar 2 being for example a simple squared profile from end to end, without threading. However, the friction on the axial end support surfaces such as 16, 27, can if necessary reduce the accuracy of the slippage torque, without special precautions such as ball or roller stops for example.

These precautions, involving a more expensive construction, could hence, in certain cases, be shown to be necessary.

Another modification would consist of providing a flexible element rubbing on a cylindrical bar of revolution which itself would be internal, the torsion being obtained by an outer worm spring, with features transposed from the preceding ones; to adjust the axial extension, that is to say the axial length $a$ of the winding.

It is hence to be noted that, in a general way and independently of the manner in which the elastic tension R is realised, means could be provided to adjust the axial length of the winding of the helicoidal element.

The result of which, whatever the embodiment adopted, torque limiters can be produced whose operation emerges sufficiently from the foregoing for it to be unnecessary to dwell further on the subject, and which have, with respect to those of the type concerned already existing, numerous advantages, for example:

that of enabling the production of a limiting torque, at least in one direction of rotation, little influenced by variations in the coefficient of friction, that of enabling the production, in the two directions of rotation, of limiting torques of different values, that of enabling easy adjustment of the value of the limiting torques, that of being simple and easy to construct.

As is self evident, and as emerges already from the foregoing, the invention is a no limited to those of its types of application and embodiment which have been more especially envisaged; it encompasses, on the contrary, all modifications.

I claim:

1. A rotary coupling of the torque limiting type comprising:
    a pair of coaxial rotating bodies, one being a driving member and the other being a driven member arranged to be driven by the driving member, said bodies being mounted for rotation in either direction,
    an at least partially deformable friction element operatively interposed between said pair of bodies such that the drive line along which the driving force is transmitted from the driving member to the driven member passes through friction engaging surfaces of said friction element, said friction element being arranged to slip when the torque required to turn the driven member exceeds a certain level, and including an elastic means operatively positioned in the drive line between the driving member and the friction element such that upon driving in one direction the driving force bypasses the elastic means and exerts its force directly on the friction element, and upon driving in the other direction the driving force from the driving member passes through the elastic means and then through the friction element such that the friction engagement characteristics of the friction element are different in the latter case as compared to the friction engaging characteristics when the elastic means is bypassed, whereby the slippage characteristics and hence also the limiting torque of the rotary coupling is different in one of said directions of rotation then in the other direction of rotation.

2. A coupling according to claim 1, said elastic means comprising at least one torsion bar arranged coaxially with the said coaxial bodies of the coupling.

3. A coupling according to claim 1, said friction elements comprising shoes arranged to frictionally engage at least one of said members.

4. A coupling according to claim 3, included in a power screwing and unscrewing tool, one of the bodies being a tube forming the body of the tool, while the other body is a ring driven by said shoes and mounted at one end of said tube, these shoes being subject to the effect of a torsion bar which is arranged inside said tube and which forms said elastic means.

5. A power screwing or unscrewing tool including a coupling of the type according to claim 4, said tube having at one end means for engaging the object to be driven, while at the other end is mounted the ring to which the screwing or unscrewing force is applied, the torsion bar being fixed at the first end, while it drives at the other end the said shoes of the coupling.

6. A coupling according to claim 1, said elastic means being a torsion bar and comprising means for adjusting the applied twisting force.

7. A coupling according to claim 1, said friction element comprising a helical tape arranged to rub frictionally on a cylindrical surface of the driven body to drive the same.

8. A coupling according to claim 7, said elastic means being a torsion bar arranged coaxially with the helical tape.

9. A coupling according to claim 7, including at least one said helical tape wound into a helix against said cylindrical surface, and including means for adjusting the axial length of the wound helix.

10. A coupling according to claim 7, said helical tape including a plurality of turns which are staggered with respect to one another.

11. A coupling according to claim 10, wherein the tapes are cut out from a single tube by means of helicoidal slots cut into the tube staggered angularly and ending at the ends of said tube.

12. A coupling according to claim 11, in combination with a torsion bar which forms said elastic means, the ends of the torsion bar being fixed to the ends of the said tube with helicoidal slots.

13. A coupling according to claim 7, said elastic means comprising a torsion bar, the ends of which bar are fixed by fixing means to the corresponding ends of at least one said helicoidal tape, and including means to adjust the respective angular positions of the ends of the tape, thereby also varying the angle of torsion of the torsion bar to thereby vary the limiting torque of the coupling.

14. A coupling according to claim 13, said fixing means between the bar and the tube with helicoidal slots comprising two series of holes, on the bar and on the tube, forming a vernier, and enabling thus a fine adjustment.

15. A coupling according to claim 7, wherein said elastic means exerts tangential stresses at the ends of the tape, and including means for mounting the tape which includes means for modifying the diameter of the winding of the helix, by a momentary change in tension or stress, so as to enable the engagement of said tape against the said corresponding cylindrical surfaces of the driven member, said momentary stress being then releasable.

16. A coupling according to claim 7, said tape being pivoted at its ends on two rings engaged on a torsion bar which forms said elastic means, one at least of these rings being mounted axially slideable and adjustment means for sliding said sliding ring for varying the axial length of the winding of the tape.

17. A coupling according to claim 16, said adjustment means comprising a nut cooperating with a threaded portion of the torsion bar.

18. A coupling according to claim 16, said adjustment means comprising a nut threadedly engaged into the said tube and cooperating with the said movable ring movable on the bar, while the other of said rings is fixed relative to the tube.

19. A coupling according to claim 16, wherein the torsion bar has a square section beyond one of said ends to enable easy engagement of a tool therewith in order to produce the initial twisting of the tape.

20. A coupling according to claim 7, said helicoidal tape being pivoted at its ends on rings mounted on a torsion bar which forms the said elastic means, and including means for temporarily making fast the tape and the outer tube, during the initial placing of the tape therein under tension.

21. A method for mounting an assembly of the type specified in claim 16, characterized by the fact that after having placed under tension the tape previously engaged in the other tube, one of the rings being temporarily fixed on said tube, the nut is screwed so as to reduce the axial length of the winding of the tape until the latter, by expansion, comes into effective contact with the surface of the tube, after which said ring is released from the tube.

* * * * *